(12) United States Patent
Olgaard et al.

(10) Patent No.: US 9,160,647 B2
(45) Date of Patent: Oct. 13, 2015

(54) SYSTEM AND METHOD FOR ENABLING TESTING A DATA LINK OF A DATA PACKET SIGNAL TRANSCEIVER

(71) Applicant: LITEPOINT CORPORATION, Sunnyvale, CA (US)

(72) Inventors: Christian Volf Olgaard, Saratoga, CA (US); Ruizu Wang, San Ramon, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 101 days.

(21) Appl. No.: 14/084,762

(22) Filed: Nov. 20, 2013

(65) Prior Publication Data

US 2015/0138998 A1   May 21, 2015

(51) Int. Cl.
*H04L 12/26* (2006.01)

(52) U.S. Cl.
CPC ............. *H04L 43/50* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 2006/0012388 A1* | 1/2006 | Lin et al. | 324/750 |
| 2007/0243826 A1* | 10/2007 | Liu | 455/67.11 |
| 2008/0094091 A1* | 4/2008 | Wang et al. | 324/765 |
| 2009/0085579 A1* | 4/2009 | Takeuchi et al. | 324/555 |
| 2009/0238371 A1* | 9/2009 | Rumsey et al. | 381/58 |
| 2010/0261431 A1* | 10/2010 | Olgaard | 455/67.11 |
| 2011/0069624 A1 | 3/2011 | Olgaard | |
| 2012/0052815 A1* | 3/2012 | Chang et al. | 455/67.11 |
| 2012/0121001 A1 | 5/2012 | Olgaard et al. | |
| 2012/0153933 A1 | 6/2012 | Wong et al. | |
| 2013/0021050 A1* | 1/2013 | Chui et al. | 324/754.03 |
| 2013/0187674 A1* | 7/2013 | Rada et al. | 324/750.02 |
| 2013/0250781 A1* | 9/2013 | Gilmartin | 370/250 |
| 2013/0294252 A1 | 11/2013 | Olgaard et al. | |
| 2014/0269365 A1* | 9/2014 | Olgaard et al. | 370/252 |

OTHER PUBLICATIONS

International Search Report and Written Opinion relative to PCT/US2014/064984, dated Apr. 20, 2015, 11 pages.

* cited by examiner

*Primary Examiner* — Benjamin H Elliott, IV
(74) *Attorney, Agent, or Firm* — Vedder Price, P.C.

(57) ABSTRACT

A system and method for enabling testing a data link of a data packet signal transceiver device under test (DUT). A RX data packet signal originating from a reference device is conveyed for reception by a DUT, and a TX data packet signal originating from the DUT is conveyed for reception by the reference device. At least a portion of the RX data packet signal is conveyed with a signal attenuation and at least a portion of the TX data packet signal is conveyed with a different signal attenuation.

18 Claims, 4 Drawing Sheets

SYSTEM AND METHOD FOR ENABLING TESTING A DATA LINK OF A DATA PACKET SIGNAL TRANSCEIVER

BACKGROUND

The present invention relates to testing data packet signal transceivers, and in particular, to testing a data link of a data packet signal transceiver.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

For testing these devices following their manufacture and assembly, current wireless device test systems typically employ subsystems for providing test signals to each device under test (DUT) and analyzing signals received from each DUT. Some subsystems include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Other subsystems can include a reference device that is similar to the current DUT and has been tested and proven to be in conformance with the performance and operation characteristics of interest for purposes of the tests to be performed upon the current DUT. This reference device is controlled and operated in a manner to exercise the current DUT to determine its conformance, or failure to conform, with the wireless signal technology standards for which it has been designed.

As part of the manufacturing of wireless communication devices, one significant component of production cost is costs associated with these manufacturing tests. Typically, there is a direct correlation between the cost of test and the sophistication of the test equipment required to perform the test. Thus, innovations that can preserve test accuracy while minimizing equipment costs (e.g., increasing costs due to increasing sophistication of necessary test equipment, or testers) are important and can provide significant costs savings, particularly in view of the large numbers of such devices being manufactured and tested.

Accordingly, it would be desirable to have techniques for testing increasingly sophisticated DUTs with increasingly varied performance characteristics and requirements without also requiring increasingly sophisticated testers with similarly increasingly varied testing characteristics and requirements.

SUMMARY

In accordance with the presently claimed invention, a system and method are provided for enabling testing a data link of a data packet signal transceiver device under test (DUT). A RX data packet signal originating from a reference device is conveyed for reception by a DUT, and a TX data packet signal originating from the DUT is conveyed for reception by the reference device. At least a portion of the RX data packet signal is conveyed with a signal attenuation and at least a portion of the TX data packet signal is conveyed with a different signal attenuation.

In accordance with one embodiment of the presently claimed invention, a system for enabling testing a data link of a data packet signal transceiver device under test (DUT) includes: a reference device signal path to convey a RX data packet signal originating from a reference device for reception by a DUT and convey a TX data packet signal originating from the DUT for reception by the reference device; a DUT signal path to convey the RX data packet signal originating from the reference device for reception by the DUT and convey the TX data packet signal originating from the DUT for reception by the reference device; and signal attenuation circuitry coupled between the reference device signal path and the DUT signal path, and responsive to one or more control signals by conveying at least a portion of the RX data packet signal with a RX signal attenuation and conveying at least a portion of the TX data packet signal with a TX signal attenuation, wherein the RX signal attenuation and the TX signal attenuation are unequal.

In accordance with another embodiment of the presently claimed invention, a method of enabling testing a data link of a data packet signal transceiver device under test (DUT) includes: conveying a RX data packet signal originating from a reference device for reception by a DUT; conveying a TX data packet signal originating from the DUT for reception by the reference device; and receiving one or more control signals and in response thereto conveying at least a portion of the RX data packet signal with a RX signal attenuation and conveying at least a portion of the TX data packet signal with a TX signal attenuation, wherein the RX signal attenuation and the TX signal attenuation are unequal.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

Figure 1:
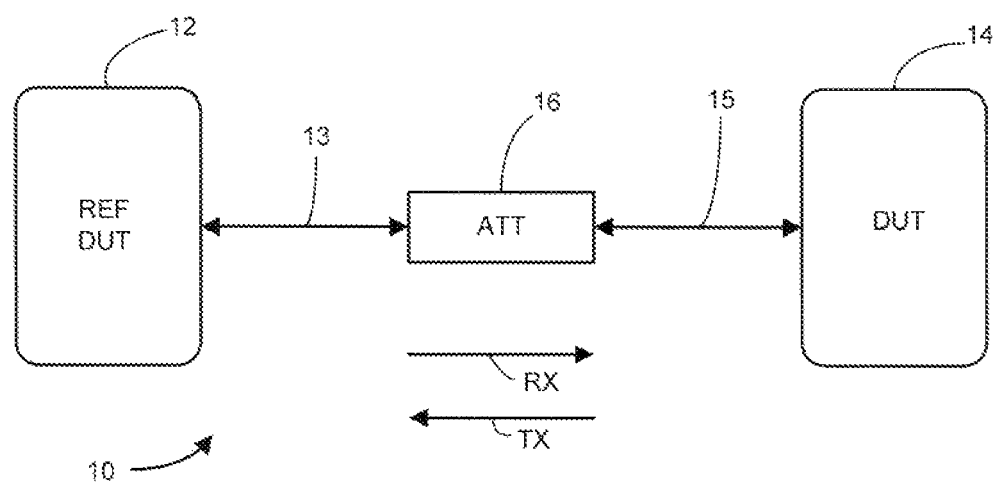
FIG. 1 depicts an exemplary embodiment of a conventional testing environment for testing a data link of a data packet signal transceiver DUT.

Referring to FIG. 1, after a DUT has been calibrated and functionally tested, it is common to perform a data link test. A typical testing environment 10 will include a reference device 12 for providing test signals RX to and receiving responsive and/or data signals TX from the DUT 14 by way of a conductive radio frequency (RF) signal path that includes an attenuator 16 connected between the reference device 12 and DUT 14 by conductive RF signal connections 13, 15 (e.g., coaxial cables and connectors) in accordance with well-known principles. The purpose of the attenuator 16 is to provide a signal path loss commensurate with that which would be experienced in a wireless radiated signal environment similar to that in which the DUT 14 is designed to operate.

However, placement and use of the attenuator 16 in this manner imparts the same signal path loss for signals traveling in both directions, e.g., the receive (RX) signals conveyed from the reference device 12 to the DUT 14 and the transmit (TX) signals conveyed from the DUT 14 to the reference device 12. Accordingly, the results of data link testing can be affected by both the DUT 14 and the reference device 12. For example, when the reference device 12 is supposed to be receiving signals from the DUT 14 (e.g., during TX testing), any failure to detect the transmit signal TX from the DUT may be due to the attenuated power level of the signal being conveyed to the reference device 12 rather than a problem with sensitivity of the receiver circuitry (not shown) within the DUT 14 and, therefore, the ability of the DUT 14 to detect and respond to the signal RX from the reference device 12. This can become particularly problematic at low data rates when the transmitted data rate will be near that of the response signal (e.g., acknowledgement (ACK) signal) data rate since little to no coding gain is available to offset differences in signal power levels.

As discussed in more detail below, in accordance with the presently claimed invention, a non-symmetrical signal path loss is provided so as to provide different signal attenuation depending upon the direction of the data packet signal flow (e.g., from the reference device 12 to the DUT 14, or from the DUT 14 to the reference device 12). As a result, it can be ensured that measured data link is due to performance of the DUT 14 rather than a combination of effects from the DUT 14 and reference device 12, thereby ensuring further that the data link results reflect behavior of the DUT 14 with no contribution from that of the referenced device 12.

Figure 2:
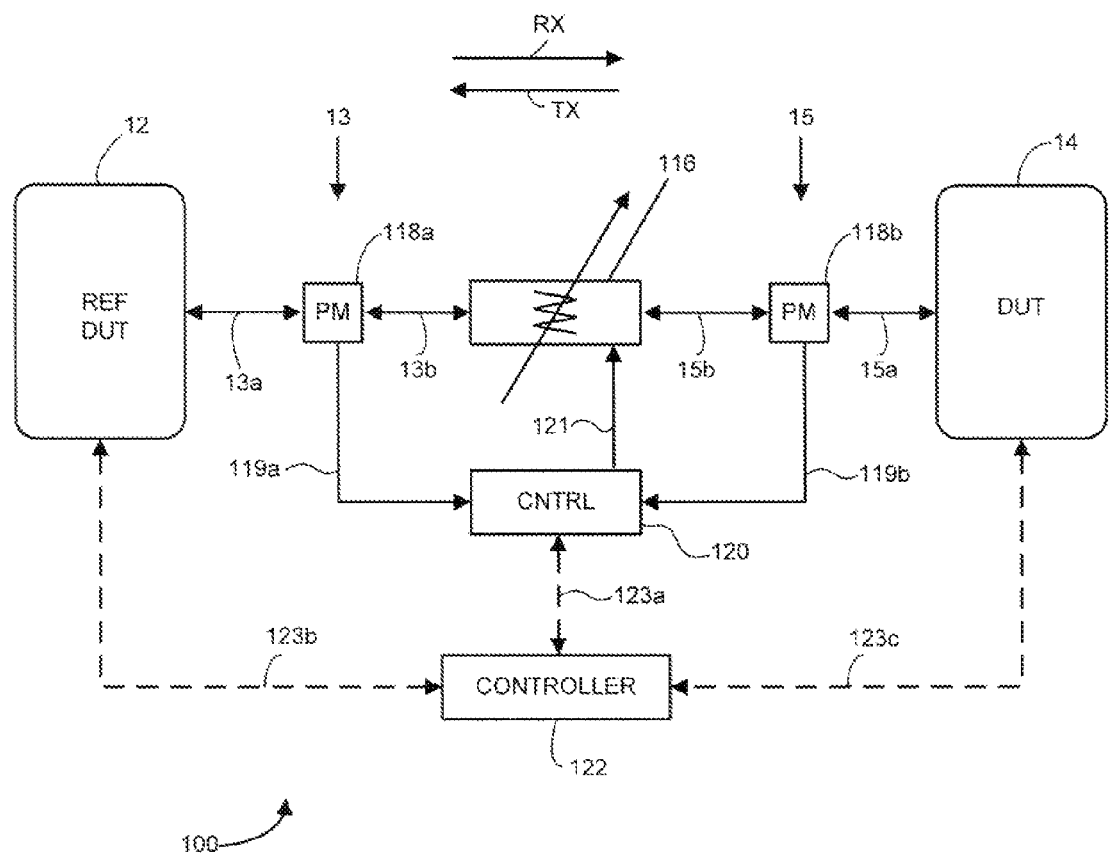
FIG. 2 depicts an exemplary embodiment of a testing environment for testing a data link of a data packet signal transceiver DUT in accordance with the presently claimed invention.

Referring to FIG. 2, in accordance with an exemplary embodiment of the presently claimed invention, the testing environment 100 includes the reference device 12 for testing the DUT 14, as discussed above. In accordance with the presently claimed invention, a variable attenuator 116 is used and the connecting signal paths 13, 15 include power measure circuits 118a, 118b connected between the referenced device 12 and attenuator 116 by conductive RF signal paths 13a, 13b and connected between the attenuator 116 and DUT 14 by conductive RF signal paths 15a, 15b as shown. These power measurements circuit 118a, 118b can be implemented in the form of well-known power sensors or power meters, with power measurement signals or data provided by way of signal interfaces 119a, 119b to control circuitry 120. This control circuitry 120, in accordance with such power measurement signals or data, provides one or more control signals 121 to the variable attenuator 116 to adjust its signal attenuation imparted to the receive signal RX and transmit signal TX, as discussed above.

As desired or needed, an additional external controller 122 (e.g., in the form of a personal computer) can be used to exchange instructions and data with the control circuitry 120, reference device 12 and DUT 14, e.g., by way of additional signal interfaces 123a, 123b, 123c, which can be implemented in the form of direct conductive signal connections or networked signal connections in accordance with well-known techniques.

As will be readily appreciated by one of ordinary skill in the art, when the attenuator 116 is imparting attenuation to the signal being conveyed, the power measurement circuits 118a, 118b will provide power measurement signals or data indicative of the direction of signal flow. For example, during conveyance of a receive signal RX ("receive" from the perspective of the DUT 14), the power measurement data 119a from the reference device power measurement circuit 118a will be indicative of a higher signal power than the power measurement data 119b from the DUT power measurement circuit 118b. Conversely, during conveyance of a transmit signal TX ("transmit" from the perspective of the DUT 14), the power measurement data 119b from the DUT power measurement circuit 118b will be indicative of a higher signal power than the power measurement data 119a from the reference device power measurement 118a.

Further, when the attenuator 116 is programmed by the control circuitry 120 to impart no attenuation (e.g., approximately zero in accordance with real world attenuation circuitry performance and tolerances) the power measurement data 119a, 119b from the power measurement circuits 118a, 118b will be substantially equal (e.g., differing only by the minimal amount of signal attenuation otherwise introduced by the presence of the disabled or bypassed attenuation circuitry 116 connected between the power measurement circuits 118a, 188b). Hence, the control circuitry 120 can be designed or programmed to react in accordance with the power measurement data 119a, 119b provided by the power measurement circuits 118a, 118b.

For example, when these power measurement data 119a, 119b are indicative of conveyance of a receive signal RX, the control circuitry 120 provides appropriate control data 121 to the attenuator 116 to impart the desired amount of signal attenuation to the receive signal RX so as to cause the magnitude of receive signal RX actually received by the DUT 14 is reduced to the level necessary for the desired test condition.

Conversely, during conveyance of the transmit signal TX (e.g., transmission of an ACK signal by the DUT 14), an indicated by the power measurement data 119b from the DUT power measurement circuit 118b, the control circuitry 120 can provide appropriate control data 121 to the attenuator 116 to cause its signal attenuation to decrease (e.g., to substantially zero) so as to ensure that the reference device 12 reliably receives the transmit signal TX.

Hence, in accordance with the power measurement data 119a, 119b from the power measurement circuits 118a, 118b, the control circuitry 120 can determine data packet signal flow direction and thereby ensure that the receive signal RX is attenuated more than the transmit signal TX, thereby ensuring that appropriately attenuated signals are provided to the DUT 14 for data link testing, while still ensuring that its transmit signals TX are reliably received by the reference device 12.

Figure 3:
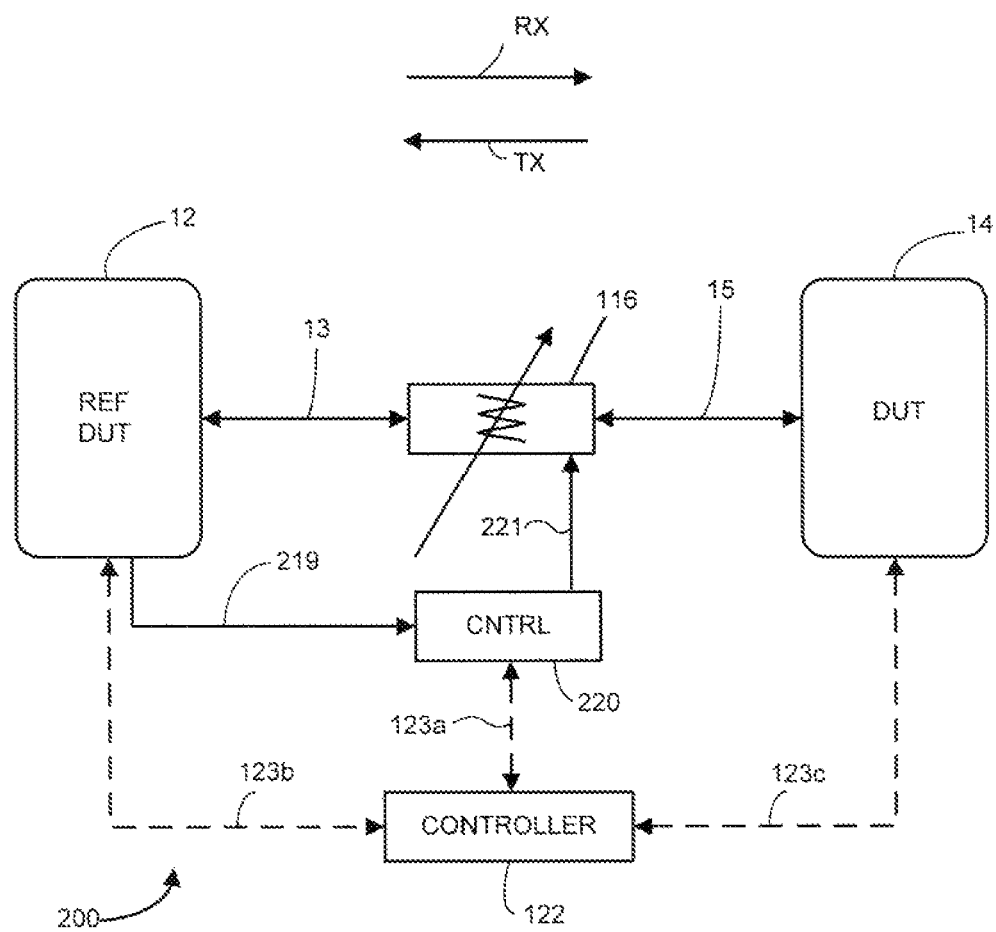
FIG. 3 depicts another exemplary embodiment of a testing environment for testing a data link of a data packet signal transceiver DUT in accordance with the presently claimed invention.

Referring to FIG. 3, in accordance with another embodiment of the presently claimed invention, the variable attenuator 116 can be connected directly to and between the reference device 12 and DUT 14, and controlled by control data 221 from control circuitry 220, which, in turn, now receives control data 219 from the reference device 12 informing it when receive signals RX and transmit signals TX are being conveyed. In other words, rather than measuring the power levels of the receive RX and transmit TX signals being provided by the reference device 12 and DUT 14, respectively, to determine whether a receive RX or transmit TX signal is being conveyed, the reference device 12 can provide data 219 informing the control circuitry 220 when a receive signal RX is being conveyed to the DUT 14 and when a transmit signal TX is expected (by the reference device 12) to be conveyed from the DUT 14. Accordingly, as before, the control circuitry 220 can then provide appropriate control data 221 to the attenuator 116 to cause it to impart higher signal attenuation during conveyance of a receive signal RX and lower (e.g., substantially zero) signal attenuation during conveyance of a transmit signal TX. One advantage of this embodiment is that the control circuitry 220 can learn of the impending receive signal RX via the since the reference device 12 can provide the data 219 informing it prior to the actual transmission of the receive signal RX, thereby affording more time to control the attenuator 116.

Figure 4:
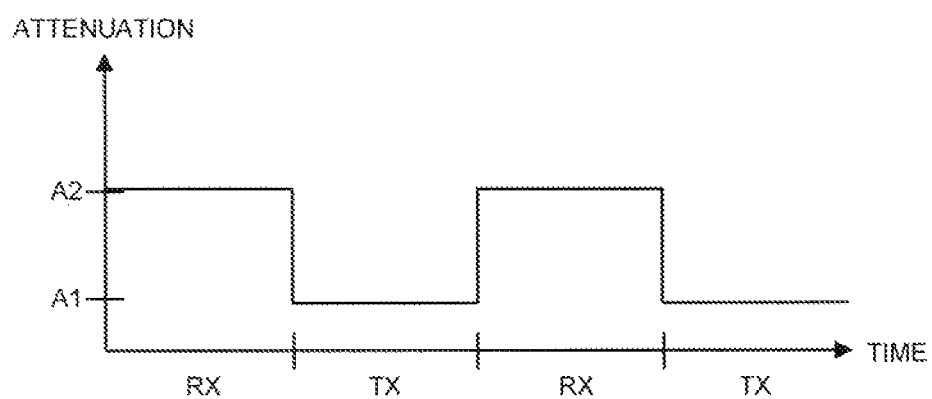
FIG. 4 depicts an exemplary timing relationship of the higher and lower data packet signal attenuation levels when testing a data link of a data packet signal transceiver DUT in accordance with the presently claimed invention.

Referring to FIG. 4, the attenuation imparted by the attenuator 116 during respective conveyances of the receive RX and transmit TX signals during receive RX and transmit TX time intervals can be better understood. For example, as discussed above, for receive signal RX testing, signal attenuation A2 is higher during receive signal RX intervals, while signal attenuation A1 is lower during transmit signal TX intervals, as shown. This ensures that the responsive DUT signal (e.g., an ACK signal) is at a power level sufficient to be accurately received by the reference device 12. Conversely, for transmit signal TX testing, which can also be considered a receive signal RX test for the reference device 12 with the test packets delivered in the opposite direction, signal attenuation A2 is higher during transmit signal TX intervals, while signal attenuation A1 is lower during receive signal RX intervals.

This attenuation behavior is also reversed when testing signal compression performance of the DUT 14 receiver circuitry, e.g., when testing for the packet error rate (PER) at a maximum input (received) signal level. This is to ensure that the DUT response signal (ACK) is at a lower level when received by the reference device 12 (i.e., within an optimal range of received signal levels) than the elevated signal level of the test signal sent to the DUT 14 for purposes of testing its maximum input signal performance. This will avoid overdriving the receiver circuitry of the reference device 12 potentially causing it to compress and prevent accurate reception of the expected ACK signal(s).

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for enabling testing a data link of a data packet signal transceiver device under test (DUT), comprising:
   a reference device signal path to convey a RX data packet signal originating from a reference device for reception by a DUT and convey a TX data packet signal originating from said DUT for reception by said reference device;
   a DUT signal path to convey said RX data packet signal originating from said reference device for reception by said DUT and convey said TX data packet signal originating from said DUT for reception by said reference device; and
   signal attenuation circuitry coupled between said reference device signal path and said DUT signal path, and responsive to one or more control signals by conveying at least a portion of said RX data packet signal with a RX signal attenuation and conveying at least a portion of said TX data packet signal with a TX signal attenuation, wherein said RX signal attenuation and said TX signal attenuation are unequal, and said signal attenuation circuitry is responsive to said one or more control signals by attenuating said RX data packet signal with said RX signal attenuation during at least a portion of a RX time interval and attenuating said TX data packet signal with said TX signal attenuation during at least a portion of a TX time interval.

2. The apparatus of claim 1, wherein said TX signal attenuation is greater than said RX signal attenuation.

3. The apparatus of claim 1, wherein said RX signal attenuation is greater than said TX signal attenuation.

4. The apparatus of claim 1, wherein said RX data packet signal and said TX data packet signal are conveyed during mutually exclusive time intervals.

5. The apparatus of claim 1, wherein said reference device signal path and said DUT signal path comprise first and second measurement circuits, respectively, responsive to said RX data packet signal and said TX data packet signal by providing at least first and second measurement signals indicative of at least a power level of said RX data packet signal and at least a power level of said TX data packet signal.

6. The apparatus of claim 5, wherein said first and second measurement circuits comprise first and second signal power sensors.

7. The apparatus of claim 5, wherein said first and second measurement circuits comprise first and second signal power meters.

8. The apparatus of claim 1, further comprising control circuitry coupled to said reference device signal path and said DUT signal path, and responsive to one or more power signals indicative of respective power levels of said RX data packet signal and said TX data packet signal by providing said one or more control signals.

9. The apparatus of claim 1, further comprising control circuitry responsive to one or more data packet flow signals indicative of said conveyance of said RX data packet signal and said TX data packet signal by providing said one or more control signals.

10. The apparatus of claim 9, wherein said one or more data packet flow signals originate from said reference device.

11. A method of enabling testing a data link of a data packet signal transceiver device under test (DUT), comprising:
   conveying a RX data packet signal originating from a reference device for reception by a DUT;
   conveying a TX data packet signal originating from said DUT for reception by said reference device; and
   receiving one or more control signals and in response thereto conveying at least a portion of said RX data packet signal with a RX signal attenuation and conveying at least a portion of said TX data packet signal with a TX signal attenuation by attenuating said RX data packet signal with said RX signal attenuation during at least a portion of a RX time interval and attenuating said TX data packet signal with said TX signal attenuation during at least a portion of a TX time interval, wherein said RX signal attenuation and said TX signal attenuation are unequal.

12. The method of claim 11, wherein said TX signal attenuation is greater than said RX signal attenuation.

13. The method of claim 11, wherein said RX signal attenuation is greater than said TX signal attenuation.

14. The method of claim 11, wherein said RX data packet signal and said TX data packet signal are conveyed during mutually exclusive time intervals.

15. The method of claim 11, further comprising measuring at least a power level of said RX data packet signal and at least a power level of said TX data packet signal to provide one or more power signals indicative of at least said power levels of said RX and TX data packet signals.

16. The method of claim 15, further comprising receiving said one or more power signals and in response thereto providing said one or more control signals.

17. The method of claim 11, further comprising receiving one or more data packet flow signals indicative of said conveying of said RX data packet signal and said TX data packet signal and in response thereto providing said one or more control signals.

18. The method of claim 17, wherein said one or more data packet flow signals originate from said reference device.

\* \* \* \* \*